FIG. I

INVENTORS
CHARLES R. KECK
PAUL W. JORDAN

BY *Semmes & Semmes*

ATTORNEYS

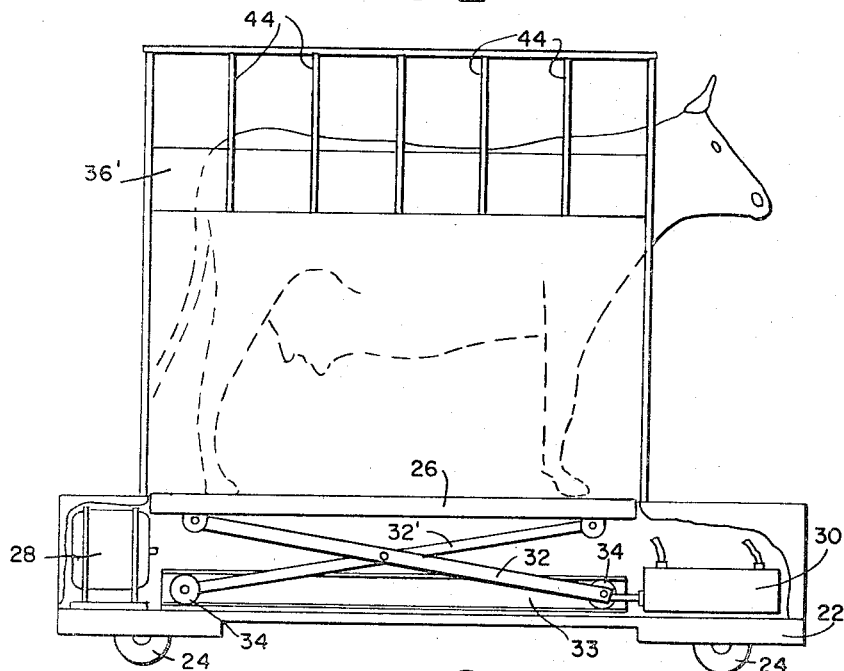
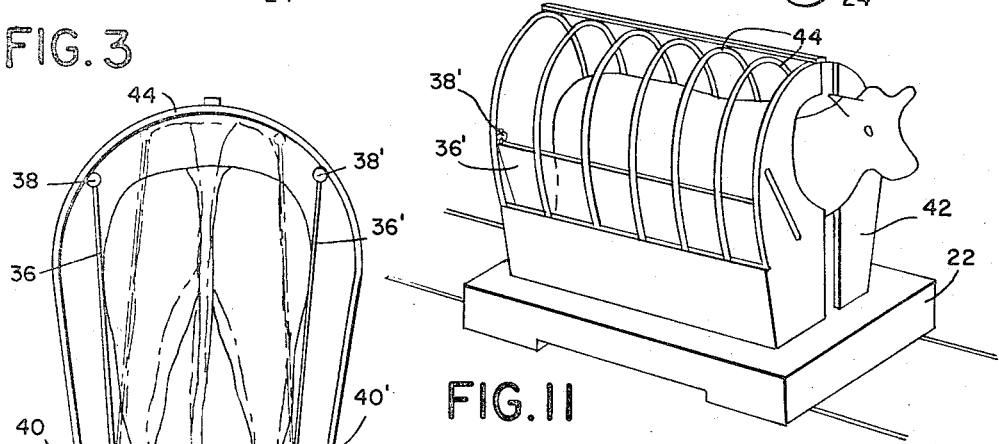
FIG. 2
FIG. 3
FIG. 11
INVENTORS
CHARLES R. KECK
PAUL W. JORDAN
BY
*Semmes & Semmes*
ATTORNEYS April 2, 1968   C. R. KECK ET AL   3,376,417
WHOLE BODY SCINTILLATION DETECTOR FOR ANIMAL USE COMPRISING
A PLURALITY OF PLASTIC PHOSPHOR RECTANGULAR LOGS
Filed May 31, 1966   6 Sheets-Sheet 3

INVENTORS
CHARLES R. KECK
PAUL W. JORDAN
BY
*Semmes & Semmes*
ATTORNEYS

April 2, 1968  C. R. KECK ET AL  3,376,417
WHOLE BODY SCINTILLATION DETECTOR FOR ANIMAL USE COMPRISING
A PLURALITY OF PLASTIC PHOSPHOR RECTANGULAR LOGS
Filed May 31, 1966  6 Sheets-Sheet 4

INVENTORS
CHARLES R. KECK
PAUL W. JORDAN
BY
*Semmes & Semmes*
ATTORNEYS

INVENTORS
CHARLES R. KECK
PAUL W. JORDAN

BY Semmes & Semmes

ATTORNEYS

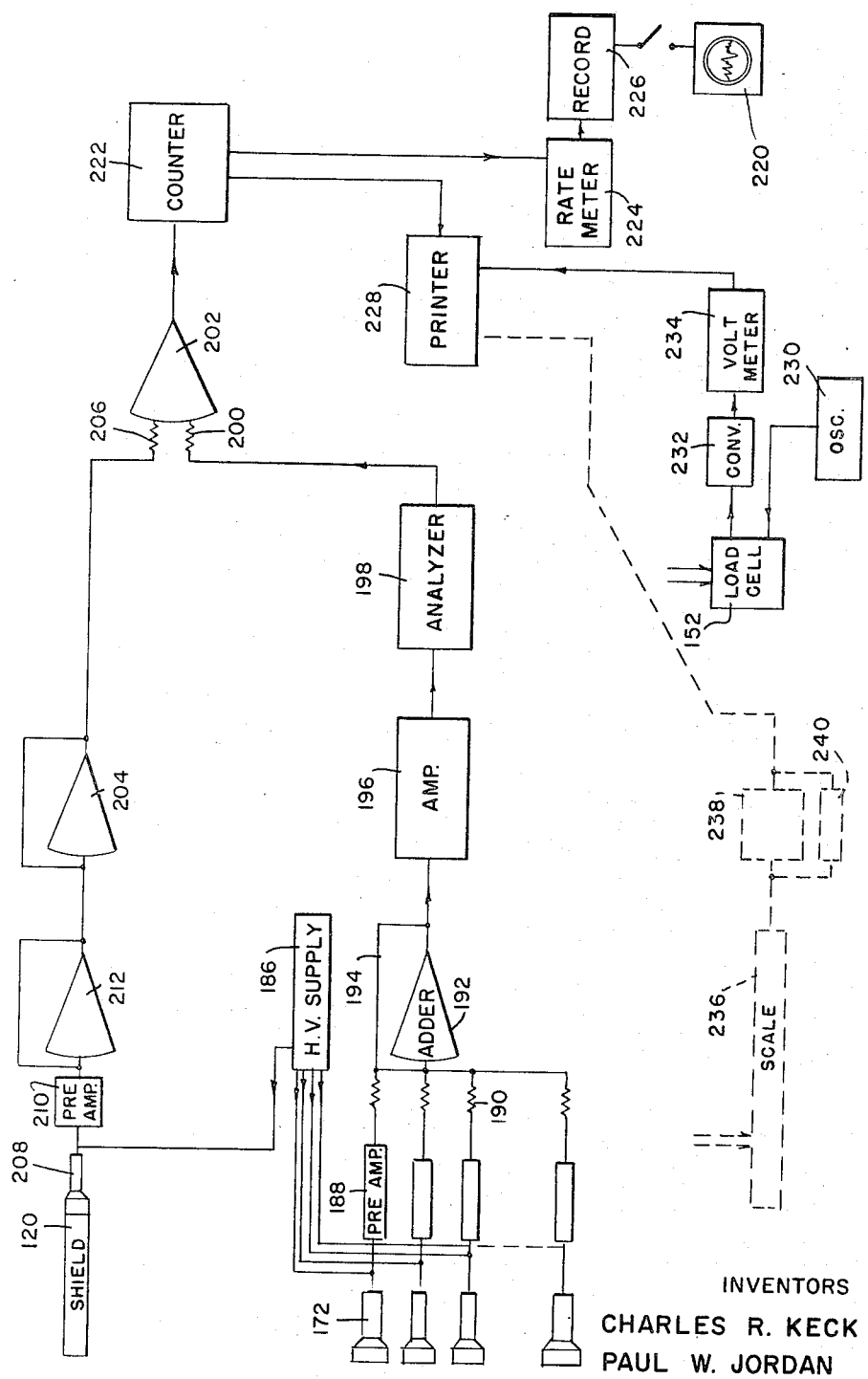

United States Patent Office

3,376,417
Patented Apr. 2, 1968

3,376,417
WHOLE BODY SCINTILLATION DETECTOR FOR ANIMAL USE COMPRISING A PLURALITY OF PLASTIC PHOSPHOR RECTANGULAR LOGS
Charles R. Keck, Morris Road, Okmulgee, Okla. 74447, and Paul W. Jordan, Montana State University, Bozeman, Mont. 59715
Continuation-in-part of application Ser. No. 443,374, Mar. 29, 1965. This application May 31, 1966, Ser. No. 554,051
3 Claims. (Cl. 250—71.5)

This invention relates to a method and apparatus for efficiently measuring the total lean meat content of live animals. It makes use of low level radiation naturally emitted from the bodies of animals and applies a scintillation technique to compute the lean-to-fat ratio.

The present application is a continuation-in-part of my application Ser. No. 443,374, filed Mar. 29, 1965, and entitled, Apparatus for Determining Lean-to-Fat Ratio in Cattle.

Naturally occurring potassium is concentrated only in the lean tissues of all living animals. Bone and fat contain little or no potassium. The potassium isotope $K^{40}$, naturally emits radiation. Our invention utilizes a low-level gamma radiation counter to measure the radiation emitted from the $K^{40}$, thereby giving an indication of the lean meat content of the animal.

Since more than ninety-seven percent of the potassium in the body is intracellular, any change in the total amount of potassium reflects a change in the ratio between the lean protoplasmic mass to the mass of bone and fat. The amount of potassium can be measured by counting the number of naturally occurring bursts of gamma radiation from $K^{40}$ within a given time. Thus, it is not necessary to inject radioactive material into the animal, thereby contaminating the meat. Instead, gamma from $K^{40}$ is constantly being radiated by all living animals, and can under suitable conditions, be measured.

Our invention is a variable research tool for the domestic animal industry, and will beneficially affect herd development and feeding programs. Since the lean meat characteristics of beef animals, for example, are 70% inheritable, it can be seen that by measurement of the lean meat content of both the sires and dams of the herds, and the subsequent selection of the high-ratio lean animals, a high lean meat herd could be developed very rapidly.

Furthermore, feeding studies indicate that the amount of lean meat put on by fast weight gaining animals, is generally put on during the early part of the feed program, and the fat is produced in the final feeding. The amount of feed generally required to put fat on an animal is about twice as much as required to put on lean meat. Therefore, if measurements are taken at weekly intervals, the exact amount of lean meat gain could be determined, and the animal slaughtered at the appropriate time, without wasting feed to produce undesired fat.

In the past, several methods have been used to determine the lean meat or carcass characteristics of live animals. These range all the way from "eyeballing" the live animals by "experts," through correlation of records of birth, weight through final weights, predicting wholesale cuts by photogrammetric measurements, estimating the body fat from anesthesia induced sleep, use of high frequency ultrasonic devices, and progeny testing. Each of these methods has limitations due to human error or the length of time required before any constructive action can be initiated. The purpose of our invention is to overcome the defects of these previous methods utilized to determine lean meat characteristics, and to provide a method and apparatus for efficiently and accurately determining the lean meat or muscle characteristics of animals.

It is therefore an object of invention to provide a method and apparatus for non-destructively determining the lean meat characteristics of domestic animals efficiently and accurately.

It is another object of invention to provide a method for non-destructively grading domestic animals according to the lean meat characteristics in order to control breeding and the production of types of animals with the desired lean meat characteristics.

It is another object of invention to provide useful measurements of the lean meat characteristics of domestic animals to develop and control the feeding program, with a view towards minimizing the use of feed for the accumulation of fat on the animals prior to slaughter.

It is another object of invention to provide apparatus to render the scintillation measurement technique of $K^{40}$ in domestic animals accurate and economically feasible for use in commercial applications.

It is another object of invention to provide an apparatus for measuring lean meat characteristics in animals, which is easily transportable, so that it may be used both during the breeding and feeding stages of animal development.

It is another object of invention to reduce the shield weight of the apparatus used to measure the lean meat characteristics of domestic animals, to thereby reduce the total weight of the apparatus.

It is another object of invention to eliminate the effect of undesired radiation, which have accumulated on the animals' hair and hide by either nature or man-made "fall-out," in order to provide an accurate $K^{40}$ count of the animal.

It is another object of invention to provide apparatus for accurately measuring the $K^{40}$ isotope present in the lean meat of domestic animals.

It is another object of invention to provide an apparatus to measure a wide range of the lean-to-fat ratio of different sized animals.

It is another object of invention to provide radiation detector equipment, in a particular geometrical configuration, in order to provide accurate $K^{40}$ measurement, as well as to provide for measuring a variety of different sized animals.

It is another object of invention to provide a particular detector shape, in combination with photomultiplier tubes, to obtain accurate $K^{40}$ measurements.

These and other objects of invention will be apparent from the following specification and drawings in which:

FIGURE 2 is a side view of the cattle squeezer, which is utilized to securely transport the cattle to and from the measuring equipment;

FIGURE 3 is an end view of the cattle squeezing apparatus;

FIGURE 10 is a block diagram of the electric circuitry utilized in this invention;

FIGURE 11 is an isometric view of the animal squeezer; and

With regard to the detection of radioactive potassium, $K^{40}$, it has been established that there is a constant ratio between the natural abundance of the stable atoms of potassium, to those of the radioactive isotopes. Among the radioactive isotopes, $K^{40}$ is potentially the most easily useable radioactive isotopes because of its relatively long half-life and natural occurrence in living tissue. Microquantitative analysis has shown that the amount of $K^{40}$ in any potassium sample varies less than $\pm 0.03\%$. Further, the decay pattern of potassium 40 is characterized by a fairly energetic gamma. Accordingly, because of the characteristic radiation energy of the gamma radiation, potassium 40 acts as an excellent tracer.

Furthermore, chemical analysis has proven that the amount of $K^{40}$ contained per unit weight in the lean tissue of animals is constant and remains relatively unchanged throughout the life of the live organism. It has also been found that any change in total potassium content reflects a change in the ratio of lean protoplasmic mass to the mass of bone and fat which contain little or no potassium. Therefore, while it is apparent that no two bovine metabolic systems are identical, the potassium content is nevertheless essentially constant for any given lean tissue and has been determined to be an average of 0.91 gram per pound of lean body tissue. Thus, because of its natural occurrence in the aforementioned constant ratio to the lean meat content of animals, detection of the radiation emitted by the $K^{40}$ forms an excellent basis for accurate determination of the lean ratio. This determination plus a knowledge of total body weight enables a determination of body composition or, in other words, lean-to-fat ratio.

Figure 1:
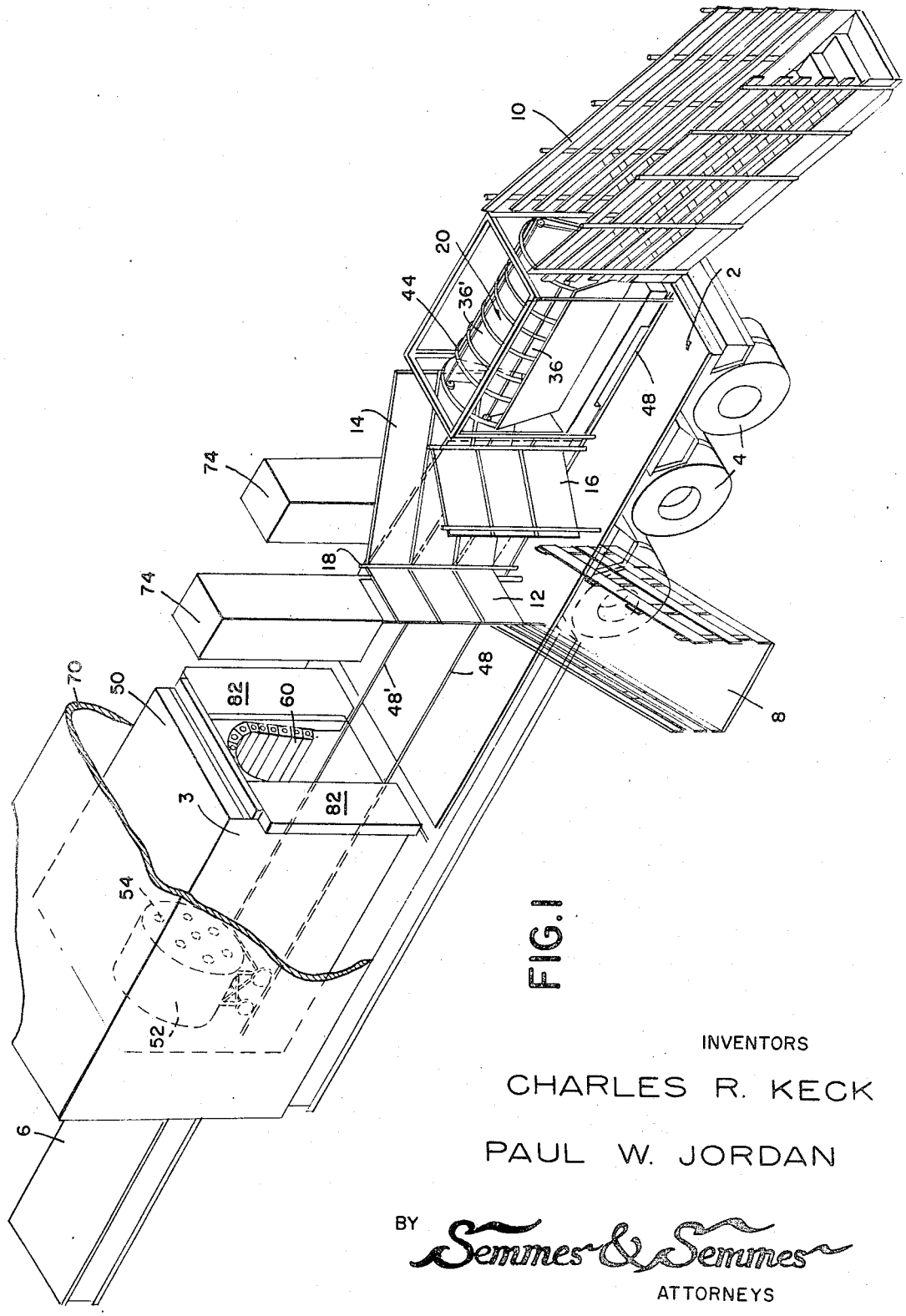
FIGURE 1 is an isometric view of the trailer and measuring equipment constructed in accordance with the principles of the present invention.

Referring to the drawings in detail, FIGURE 1 illustrates a mobile apparatus generally referred to by reference numeral 2, by means of which rapid, relatively accurate and non-destructive testing of animals may be performed in accordance with the principles of the present invention. So as to render the apparatus mobile, and to provide easy transportability, the total weight of trailer 2 should be such that it falls within the range allowed on public highways.

Trailer 2 is supported by wheel assembly 4 at one end, and retractable jack mechanism 7 (not shown) spaced from the other end. It is also provided with hitch 6 to provide easy connection of the trailer to the cab section of a truck for transportation. Also mounted on the trailer 2 are enclosures 74 within which the electronic monitoring and measuring facilities may be housed, as well as other equipment. Also mounted on the platform intermediate the opposite ends thereof, is radiation detector chamber 50 within which the detecting means are located.

The detection chamber 50 comprises a five inch thick steel radiation shield 3 which forms the top, walls, and one end of the chamber. Additionally, five inch thick steel doors 8 are mounted on rollers, and further act as a shield from unwanted radiation which would cause an inaccurate $K^{40}$ determination. The radiation chamber is then enclosed by an insulated aluminum van cover 70.

Ramps 8 and 10 are detachable from the trailer. Together with gates 12, 14 and 16 they provide for the entrance and exit of the animal to squeezer 20. In the position of the gates illustrated in FIGURE 1, animals will climb up ramp 8 through gates 12–16, into squeezer 20. Gate 14 is pivotably mounted to support 18, and when it is desired to transport the animal into the detection chamber 50, gate 14 is moved to the position wherein it simultaneously closes off ramp 8, and permits squeezer 20 to be transported along rails 48 and 48' into the detection chamber 50. This is illustrated by the broken line position of gate 14 in FIGURE 1. A scale of the type employing conventional load cells may be positioned at the bottom of squeezer 20 so that the animal may be weighed prior to counting. The correlation of body weight to $K^{40}$ count determines, of course, the lean to body weight ratio.

After measuring the lean meat characteristics, the squeezer containing the animal is transported back along rails 48 and 48' to the position shown in the drawings. The animal is then released down ramp 10 and gate 14 is returned to the original position illustrated in FIGURE 1. Animals released from the squeezer 20 may therefore leave the trailer through the exit ramp, while at the same time, another animal may be loaded into the squeezer. This process continues until all animals have been measured.

The purpose and function of the animal squeezer is more clearly defined in FIGURES 2 and 3. FIGURE 2 shows that it is mounted on truck 22, which is provided with wheel assembly 24 to ride rails 48 and 48' for easy transportation of the animal squeezer 20. Truck 22 further comprises a table surface 26 upon which the animal stands. Table 26 is variable in the vertical direction by hydraulic lift 30, operable by motor 28. When it is desired to raise the table, hydraulic lift 30 forces rigid rod 32 along track 33. Rods 32 and 32' are pivotably mounted together and are rigidly secured in track 33 by wheels 34. The movement of rods 32 and 32' towards each other, causes the upward movement of table top 26. Conversely, the movement of rods 32 and 32' away from each other causes the downward movement of table 26. It is apparent that vertical adjustment is necessary in order to properly position the immobilized animal within the detection chamber 50 when the radiation reading is taken.

As illustrated in FIGS. 3 and 11, walls 36 and 36' are securely pivotally mounted to table 26, and are also mounted via rollers 38 and 38' to run in a track on end walls 40 and 42. Thus, as the animal is fed into the animal squeezer 20, table 26 is raised until the animal is positioned at the top of the cage defined by end walls 40 and 42, and by semicircular bars 44 securely mounted to the side walls 36 and v6'. End wall 42 securely positions the animal's neck and head.

When the animal is in the detection chamber, it is essential that he be located in a position near the plastic phosphor detectors. The purpose of table top 26 is to position different sized animals correctly in relation to the plastic phosphor blocks. The table top 26 further functions with side walls 36 and 36' to squeeze the animal in position so that he cannot move about.

As table 26 is raised, walls 36 and 36' via rollers 38 and 38' will be forced upwardly along the track. Because of the circular configuration of end walls 40 and 42, and because walls 36 and 36' are rigid and are securely mounted to table 26, this will cause a lateral movement of walls 36 and 36' towards each other. This is illustrated in FIGURE 3, in which the broken lines illustrate the position of walls 36 and 36' when table 26 is in its furthermost raised position. The movement together of walls 36 and 36' will thus "squeeze" the animal so that it is securely positioned in squeezer 20. This is essential, since movement of the animal during measurement of the lean-to-fat ratio, could cause inaccuracies in the measurement, as well as damage to the detector.

It will therefore be apparent that the animal handling procedure not only facilitates rapid processing of the animals, but also arranges for the proper orientation of the immobilized animal within the detection chamber so that an accurate measurement of the radiation emitted therefrom may be made.

Figure 5:
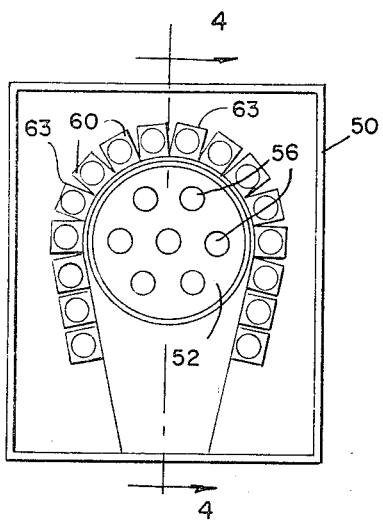
FIGURE 5 is an end view of the detection chamber, illustrating the phosphor block-photomultiplier geometrical configuration.

FIGURE 5 illustrates the configuration of the circular plastic phosphor radiation detector 52 which is positioned on a roller support at the rear end of chamber 50. Support 52 is movable along tracks 48 and 48′, in the center of the radiation detector chamber 50. Several photomultipliers 56 are mounted on the back side of the circular phosphor radiation detector 52, their purpose to be explained hereinafter.

Figure 4:
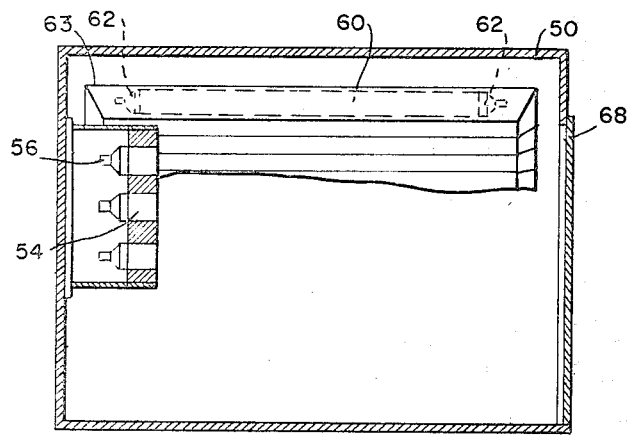
FIGURE 4 is a sectional view, partially cut-away, of the detection chamber, illustrating the phosphor detectors and the photomultipliers, taken along the section lines 4—4 of FIGURE 5.

FIGURE 4 is a top plan view of the detection chamber, which is partially cutaway, and which therefore illustrates only one of the phosphor logs 60. A plurality of the rectangular log phosphor radiation detectors 60 are positioned within the chamber on a support ring at each end, for measurement of the carcass ratio.

Photomultipliers 62 are securely attached to each end of each log 60. The logs 60 are located around the radiation detection chamber 50 in a horseshoe configuration as illustrated in end view FIGURE 5, as well as in isometric FIGURE 1.

Plastic phosphors are used in the detector equipment to measure the $K^{40}$ count from the animals. Some of the reasons for using plastic phosphors are as follows:

(1) The light output of the better quality plastic phosphors approaches that of the best liquid scintillators and offers certain advantages:

(a) freedom from poisoning by atmospheric oxygen and trace environmental impurities
(b) complex mounting problems are greatly diminished
(c) easily machined and formed into special shapes.

(2) Plastic phosphors provide the following advantages over inorganic crystals such as NaI (T1):

(a) shorter decay time
(b) non-hygroscopic
(c) less susceptible to thermal and mechanical shock
(d) easily machined and formed into special shapes
(e) lower cost.

The blocks or logs 60 utilized are approximately 6″ x 6″ x 60″ although the specific dimensions are not pertinent to the basic principles of this invention. Each log or block is highly polished, and the end of each block is optically coupled to a photomultiplier tube 62 as illustrated in FIGURES 4 and 5.

Phosphor logs 60 are made of a material which will, upon contact with gamma radiation, produce tiny bursts of light or scintillations corresponding to the passage of gamma rays therethrough.

After the conversion of gamma energy to visible light quanta by the phosphor, the light is transmitted by the plastic through a process of transmission and multiple reflection to each end of the "log." Each end of the detector is optically coupled to a photomultiplier tube 62 which produces a pulse of elecrtic current every time a burst of light occurs. The height of the pulse varies directly with the strength of the burst of light. Because of the use of a photomultiplier tube at each end of the phosphor log, a greater amount of phosphor can be viewed by each photomultiplier tube, than in any known configuration heretofore in use with no loss, or in some cases an improvement in resolutions as hereinafter explained.

Figure 7:
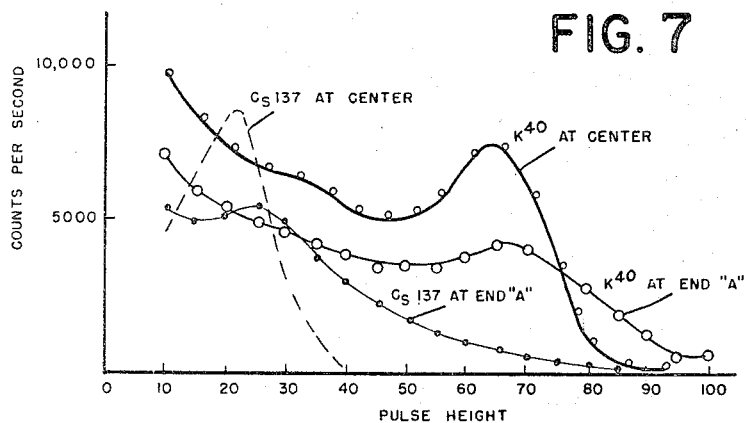
FIGURE 7 is a graph showing the relative pulse-heights produced by a scintillation detector, which comprises a rectangular log 6″ x 6″ x 60″, with two multiplier tubes, one at each end, but without light pipes.
Figure 8:
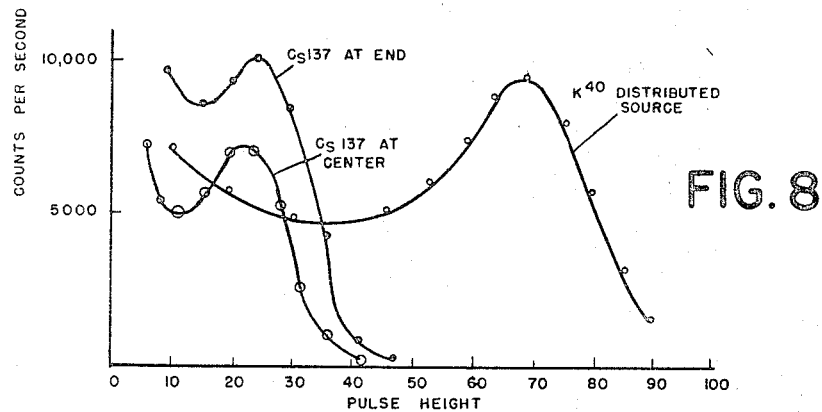
FIGURE 8 is graph showing the measurements of a scintillation detector of a log 6" x 6" x 60", with light pipes, showing the relative pulse-heights produced by $Cs^{137}$ and $K^{40}$.

The use of highly polished phosphor blocks in the special shape and configuration disclosed, permits the blocks to function both as a light pipe and scintillation detector. The pulse-height resolution from a gamma source which contacted a plastic phosphor block without light pipes 30 inches from a photomultiplier tube is shown in FIGURE 7. FIGURE 8 shows resolution using a distributed source such as is obtained through a rectangular plastic log with light pipes, according to the present invention.

Furthermore, by this method of end viewing in which no protruding tubes in a direction lateral to the long dimension of the detector are used, a great saving in space is effected. This in turn reflects in such reduced shield weights that the detector design disclosed greatly enhances transportability of the trailer. Thus, the $K^{40}$ radiation within the lean tissue of the animal is detected by a plastic phosphor detector which converts the gamma energy to light quanta. This light quanta is transmitted optically along logs 60 which also act as a light pipe to the photomultiplier tubes, and is then connected to the electric circuitry which will hereafter be described.

Another species of logs which may be used were also developed. This involved the utilization of a bundle of scintillator rods feeding into a single photomultiplier tube, and provided a sufficiently effective cross-section. One advantage of these "small rod bundles" is lower manufacturing cost, because the rods could then be extruded.

Figure 6:
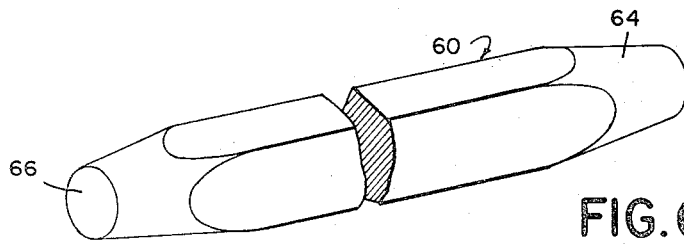
FIGURE 6 is a perspective view of the plastic phosphor block utilized in the present invention.

However, there are additional advantages associated with the solid large cross-section logs. This type of log, as illustrated in FIGURE 6 decreases the number of reflections which the light must encounter as it travels between the point of origin and the photomultiplier tube cathode. Thus, there is light lost not only through transmission, but also at the surface during each subsequent reflection. This is due to surface imperfections and is a function of the number of reflections occurring. Thus, the large cross-section causes the light to suffer less attenuation, thereby reducing the differential in pulseheight. This is particularly important, since the less attenuation of the light source, the better spectral resolution is obtainable.

Figure 9:
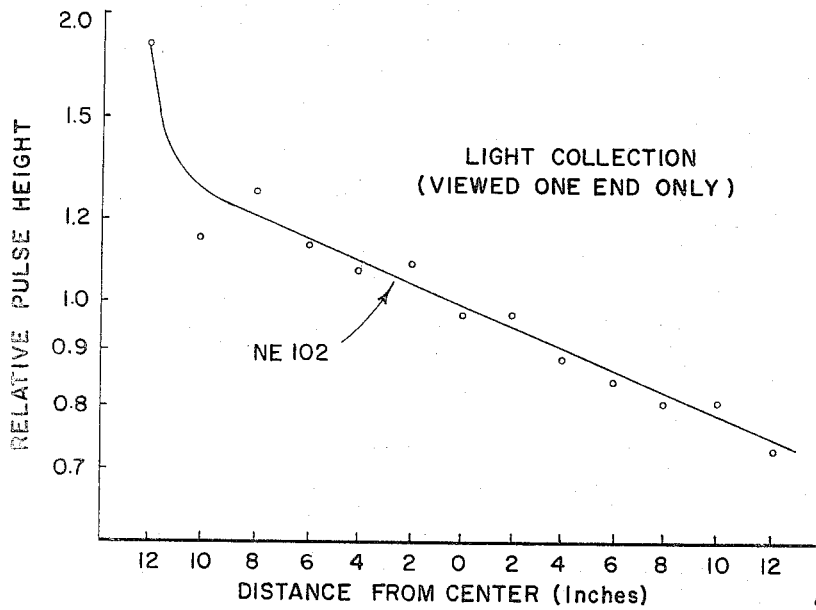
FIGURE 9 is a graph illustrating the relative pulse-height obtained relative to distance from the end of the phosphor, viewed from one end only.

FIGURE 9 shows the effect of the relative pulse-height of light generated by the phosphor blocks compared to the distance from the end of the phosphor block.

The use of a photomultiplier tube at each end of the phosphor causes the outputs of these tubes to be additive. Thus, as the pulse amplitude from one tube decreases with increasing distance of photon origin from its cathode, the pulse-height is increasing at the other photomultiplier tube. This decay or attenuation is exponential so that while the summed output is not "flat," FIGURE 12, it still gives a greater degree of freedom from being effected by the position of photon origin.

Figure 12:
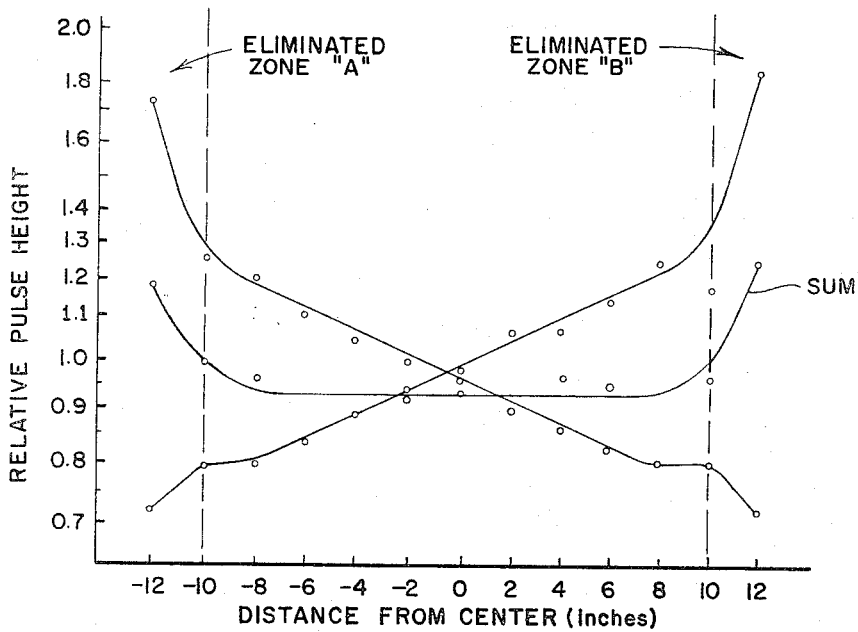
FIGURE 12 is a graph illustrating pulse-heights obtained relative to distance from both ends of the phosphor log, as well as the "sum" of both pulses and the eliminated good A and B.

The curve of the pulse-height of the light generated versus pulse origin, FIGURE 12 is a rather flat saddle, but has a marked upturn at each end within a few centimeters of each photomultiplier tube face. This is because light decay is due to a combination of exponents. In addition to the basic decay curve, there is also a rapid absorption of certain wave lengths in the first few centimeters from the point of light generation in the phosphor log, which creates a wavelength shift in the composition of light and gives rise to the sharp increase in pulse-height when the light originates next to a photomultiplier tube face.

Elimination of this zone at both ends of log 60 is an important object of this invention. In FIGURE 12 the eliminated zones A and B are illustrated graphically with respect to relative pulse-height and distance from the respective log 60 ends. This is done by using a four inch long truncated conical extension or light pipe 64 of the logs 60, mated at end 66 with the five inch circular photomultiplier tube faces. Extension or light pipe 64 is of the same plastic material as the main phosphor, but contains no fluor. Thus, no gamma light conversion can occur within four inches of the tube face. This eliminates any sharp increases at the ends of the curve and keeps the differential between maximum and minimum pulse height from the same gamma ray energy source to a minimum. This in turn increases the resolving power of the detector logs.

Because of the simplicity of shape of the detector logs utilized, mounting and placement of each of the detector units becomes relatively easy. This permits placement of the detector units in an optimum geometric configuration, and also provides adaptability of the entire counter.

Each of the plastic phosphor logs is housed in a stainless steel channel 63. The channel 63 forms a rigid light-tight case, and is longer in length than the phosphor. It can thus be easily attached to a mounting ring at the front and rear of the vault as illustrated in FIGURES 1, 4 and 5. The mounting ring produces the desired overall detector configuration, and provides variability since increased detector area can be had by inserting additional detector units. For carcass grading, a continuous flow detector tunnel can be formed of the rectangular logs.

In the past, careful washing and handling of each animal has been necessary in order to prevent degrading the $K^{40}$ determination by the inclusion of gamma count from $Cs^{137}$ and other undesirable isotopes which have accumulated on the animal's hair and hide. Such contaminants might occur in nature or be caused by man made "fall-out." This invention, however, increases the resolution of the phosphor detectors and electronic equipment to the extent that such undesirable counts are excluded and discriminated against electronically on the basis of pulse-height (gamma ray energy level). This eliminates extra handling of the animal, but does not increase the time required for $K^{40}$ count determination.

For example, FIGURE 7 illustrates the results obtained with a detector which comprised a 6" x 6" x 60" log, with two photomultiplier tubes, one at each end, but without light pipes. The effect of the undesired $Cs^{137}$ at both the center of the detection chamber as well as at end A (see FIGURE 4), shows that the pulse-height of the $Cs^{137}$ approaches the relatively high level of 85 at end A. This, of course, would cause an inaccurate determination of the lean-to-fat meat ratio, because much of the measurement is due to the inclusion of gamma count from $Cs^{137}$.

FIGURE 8, on the other hand, shows the increased resolution power from our improved detector. This graph was prepared from measurements of a 6" x 6" x 60" log, of the type disclosed in FIGURE 6. The $Cs^{137}$ pulse-heights, at both the center and end of the log, are substantially lower, relative to the $K^{40}$ distributed source count. This results in better resolution, allowing the operator to "scan" a narrower range of the gamma ray spectrum, thereby increasing the $K^{40}$ noise ratio.

Our improved detector design also decreases the loss of $K^{40}$ count scattered into the regions below the "discrimination level" used to reject the $Cs^{137}$. FIGURE 8 shows that the discrimination level for $Cs^{137}$ can be somewhere between 40 and 50. The $K^{40}$ pulse height in this region is relatively low compared to the $Cs^{137}$ pulse height within this region and hence the $K^{40}$ count loss is minimized. However, above the 40–50 pulse height discrimination level, the $K^{40}$ distributed source accounts for almost all of the gamma ray energy detected. However, in FIGURE 7, where light pipes were not used, $Cs^{137}$ pulse-height at end A increased to about 85 thereby precluding a low cesium discrimination level. Thus, our detector geometry and shape results in a more accurate determination of the lean-to-fat ratio. It also increases the count efficiency, which is defined as the percent of total $K^{40}$ gammas emitted which are actually counted, because of the detector geometry and versatility.

What is claimed is:
1. A whole body scintillation detector and light pipe especially adjustable for animal use which comprises:
    (A) a plurality of highly polished plastic phosphor rectangular log detectors arranged in a horseshoe configuration in a detection zone, with at least one circular plastic phosphor detector mounted at one end of said zone;
    (B) a truncated conical section of plastic phosphor containing no fluor, mounted at each end of said logs as a light pipe;
    (C) photomultiplier tubes mated to said truncated conical sections and to said circular phosphor detector, said photomultiplier tubes being connected in electrical additive relationship, whereby a source of radioactive energy striking said plastic phosphor, produces a burst of light which travels along said block and is converted by said photomultiplier tubes to electrical energy.

2. A scintillation detector as in claim 1, including a radioactive shield positioned about said detector and said detection zone.

3. A scintillation detector as in claim 1, including means for immobilizing and transporting an animal in and out of said detection zone.

References Cited

UNITED STATES PATENTS

| | | | |
|---|---|---|---|
| 2,711,482 | 6/1955 | Goodman | 250—71.5 X |
| 2,949,534 | 8/1960 | Youmans | 250—71.5 |
| 3,035,172 | 5/1962 | Cowan | 250—71.5 |
| 3,237,765 | 3/1966 | Gaudin et al. | 250—71.5 X |

OTHER REFERENCES

Pringle et al.: K-40 Gammas Give Estimate in Lean Meat Content; from Nucleonics, February 1961, pp. 74, 76, 78.

Regas, S.: Low Level Gamma Counters and Their Uses in Biology and Medicine; Reprinted from Biomedical Sciences Instrumentation, vol. 1, Plenum Press, New York (1963), pp. 239 to 248.

ARCHIE R. BORCHELT, *Primary Examiner.*